(12) United States Patent
Jang et al.

(10) Patent No.: US 10,843,675 B2
(45) Date of Patent: Nov. 24, 2020

(54) ACTUATOR FOR ELECTROMECHANICAL PARKING BRAKE HAVING HOUSING WITH BRUSH CARD ASSEMBLY

(71) Applicant: KEYANG ELECTRIC MACHINERY CO., LTD., Seoul (KR)

(72) Inventors: Su Gil Jang, Cheonan-si (KR); Ho Gun Lee, Hwaseong-si (KR); Jang Soo Park, Suwon-si (KR)

(73) Assignee: KEYANG ELECTRIC MACHINERY CO., LTD., Seoul (KR)

( * ) Notice: Subject to any disclaimer, the term of this patent is extended or adjusted under 35 U.S.C. 154(b) by 0 days.

(21) Appl. No.: 16/368,062

(22) Filed: Mar. 28, 2019

(65) Prior Publication Data

US 2020/0307539 A1 Oct. 1, 2020

(51) Int. Cl.
| | |
|---|---|
| *B60T 13/74* | (2006.01) |
| *F16H 61/22* | (2006.01) |
| *F16D 65/18* | (2006.01) |
| *F16D 65/02* | (2006.01) |
| *B60T 7/04* | (2006.01) |
| *F16D 121/24* | (2012.01) |

(52) U.S. Cl.
CPC ............ *B60T 13/746* (2013.01); *B60T 7/045* (2013.01); *F16D 65/02* (2013.01); *F16D 65/18* (2013.01); *F16H 61/22* (2013.01); *F16D 2121/24* (2013.01); *F16H 2061/223* (2013.01)

(58) Field of Classification Search
CPC ........ B60T 13/746; B60T 7/045; F16D 65/02; F16D 65/18; F16H 61/22
See application file for complete search history.

(56) References Cited

U.S. PATENT DOCUMENTS

| | | | |
|---|---|---|---|
| 8,790,208 B2* | 7/2014 | Poertzgen | ............. B60T 13/741 475/149 |
| 2012/0325601 A1* | 12/2012 | Giering | ............... F16D 65/0006 188/162 |
| 2014/0090933 A1* | 4/2014 | Sakashita | ............. F16D 55/226 188/72.4 |

(Continued)

FOREIGN PATENT DOCUMENTS

| | | |
|---|---|---|
| DE | 202017104469 U1 | 10/2018 |
| KR | 10-1041553 B1 | 6/2011 |
| KR | 10-2013-0071256 A | 6/2013 |

(Continued)

*Primary Examiner* — Vishal R Sahni
(74) *Attorney, Agent, or Firm* — Novick, Kim & Lee, PLLC; Jae Youn Kim (57) ABSTRACT

An actuator for an electromechanical parking brake having a housing with a brush card assembly is provided, which includes: a main housing having a motor seat and a gear seat; a motor assembly disposed in the motor seat and providing torque; a gear assembly rotated by torque from the motor assembly and performing a reduction function through a plurality of gears; and an inner housing. The inner housing is combined with the main housing and fixes the gear assembly, and integrally has a ring gear operating in mesh with a planetary gear seat of the gear assembly and a brush card electrically connected to the motor assembly. A ring gear operating with the planetary gear set and a brush card electrically connected to the motor assembly are integrally formed at the inner housing.

9 Claims, 8 Drawing Sheets

(56) References Cited

U.S. PATENT DOCUMENTS

2015/0075923 A1* 3/2015 Jang .................. F16D 65/18
                                                          188/162
2017/0271947 A1* 9/2017 Ando .................. F16D 55/36

FOREIGN PATENT DOCUMENTS

| KR | 101460507 | * 11/2014 |
| KR | 10-1867966 B1 | 6/2018 |
| KR | 2018-0061549 A | 6/2018 |

* cited by examiner

ACTUATOR FOR ELECTROMECHANICAL PARKING BRAKE HAVING HOUSING WITH BRUSH CARD ASSEMBLY

BACKGROUND OF THE INVENTION

Field of the Invention

The present invention relates to an actuator that performs an electromechanical parking brake operation and, more particularly, to an electromechanical parking brake actuator in which a ring gear and a brush card are integrally formed in a gear box disposed therein.

Description of the Related Art

An actuator for an automotive electromechanical parking brake is an apparatus for operating friction pads disposed on a caliper of a disc brake system for parking. The actuator is automatically operated when a user operates a switch for an electromechanical parking brake, and for this purpose, the actuator includes an electromechanical parking brake motor and a gear assembly (power transmission device) for transmitting power from the motor.

According to the way of using such an electromechanical parking brake, when a driver presses down a parking brake switch, torque of the motor of the actuator is transmitted to an input shaft of a caliper through a gear assembly (power transmission device) such as a reducer. The input shaft receiving the power is rotated, and accordingly, a pressing connection sleeve moves forward, and a piston and a caliper housing that accommodate the connection sleeve are moved close to each other by the forward movement of the sleeve. Further, two friction pads mounted on the piston and the caliper housing press both sides of a disc to prevent rotation, whereby parking is achieved.

Such an actuator is composed of several parts and these parts are assembled and operated together, so tolerance management is important. For example, a gear box installed inside includes several gears, and a brush card assembly and a ring gear should be combined with the gear box. The ring gear is a part with which a planetary gear set included in the gear box is engaged, so it is specifically important to minimize a tolerance.

However, a brush card assembly and a ring gear that are separated parts are combined with the gear box, so the inter-center distances of rotary shafts of rotary parts including gears are likely to come out of an allowable range due to an accumulated tolerance between the parts in the assembly process. Further, performance may be deteriorated or a problem with quality such as noise may be generated by the distance errors between the rotary shafts. In particular, vibration that is generated in operation due to an inter-shaft distance error causes shaking of the parts including gears and deteriorates durability of the gears, thereby reducing durability of the resultant product.

This is because precise inter-shaft alignment is difficult when combining parts such as a motor and gears, and particularly, a gear assembly (or a gear box) for a reduction function is a separate part from a motor assembly, so inter-shaft alignment of parts spaced apart from each other is more difficult. Further, since the brush card assembly and the ring gear should be combined with the gear box, the manufacturing time and cost are increased.

Further, the gear box supports several rotary parts including gears, so vibration is continuously applied to the gear box. Accordingly, the gear box may be distorted or damaged by long-time use or shaking due to the error described above. Obviously, it is possible to prevent this distortion or damage by using a material having higher durability for the gear box, but the entire manufacturing cost is increased in this case.

DOCUMENTS OF RELATED ART (Patent Document 1) Korean Patent No. 10-1041553
(Patent Document 2) Korean Patent Application Publication No. 10-2013-0071256

SUMMARY OF THE INVENTION

The present invention has been made in an effort to solve the problems in the related art and an object of the present invention is to improve convenience of assembly and inter-shaft alignment by integrating a brush card assembly and a ring gear with an inner housing of an actuator.

Another object of the present invention is to reinforce an inner housing by providing a reinforcing plate inside the inner housing.

According to an aspect of the present invention for achieving the objects, an actuator for an electromechanical parking brake having a housing with a brush card assembly includes: a main housing having a motor seat and a gear seat; a motor assembly disposed in the motor seat and providing torque; a gear assembly rotated by torque from the motor assembly and performing a reduction function through a plurality of gears; and an inner housing combined with the main housing to fix the gear assembly and having an integrated ring gear operating with a planetary gear set of the gear assembly and an integrated brush card electrically connected to the motor assembly.

The inner housing may have: a main body part extending left and right; the brush card part disposed at a side of the main body part and having motor terminals and a brush constituting a brush card; and a ring gear part disposed at an opposite side of the main body part corresponding to an opposite side to the brush card part, accommodating planetary gears of a planetary gear set, and having revolution gear teeth on an inner circumferential surface for revolution of the planetary gears.

A reinforcing plate having an uneven shape may be disposed inside the inner housing.

The reinforcing plate having an uneven shape may be disposed inside the inner housing through insert injection molding.

The reinforcing plate may be made of metal and may be disposed inside the inner housing to extend in a longitudinal direction of the inner housing.

The reinforcing plate may have: a brush card-reinforcing part disposed close to the brush card part of the inner housing and having a ring-shaped protrusive reinforcing rib surrounding a motor shaft of the motor assembly; and a ring gear-reinforcing part disposed close to the ring gear part of the inner housing and protruding in a ring shape to surround an edge of a ring gear.

The reinforcing plate may have a plurality of recessed reinforcing beads.

An installation fence may protrude along an edge of the main body part of the inner housing, and an idle gear connecting the motor assembly and the gear assembly to each other and a drive gear engaged with the idle gear and rotating a planetary gear set may be disposed in a space surrounded by the installation fence.

The actuator for an electromechanical parking brake having a housing with a brush card assembly according to the present invention has the following effects.

A brush card electrically connected to a motor assembly is integrally formed with an inner housing. Accordingly, several parts operating together are aligned in one inner housing, so inter-shaft alignment of a motor and gears is improved and accordingly performance of a product is improved.

Further, since a brush card that is separately manufactured and then combined in the related art is integrally formed with the inner housing, the entire assembly process is reduced and tolerance regulation becomes easier.

Further, since a reinforcing plate made of metal is provided in the inner housing through insert injection molding and reinforces strength of the inner housing, the possibility of distortion or damage due to long-time use or vibration during operation is reduced, so durability is increased.

Further, a ring gear part operating with a planetary gear set may also be integrally formed with the inner housing, so inter-shaft alignment of a motor and gears is improved and accordingly performance of a product can be further improved.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Hereinafter, some embodiments of the present invention are described in detail with exemplary drawings. It should be noted that when components are given reference numerals in the drawings, the same components are given the same reference numerals even if they are shown in different drawings. In the following description of embodiments of the present invention, when detailed description of well-known configurations or functions is determined as interfering with understanding of the embodiments of the present invention, they are not described in detail.

Terms 'first', 'second', 'A', 'B', '(a)', and '(b)' can be used in the following description of the components of embodiments of the present invention. The terms are provided only for discriminating components from other components and, the essence, sequence, or order of the components are not limited by the terms. When a component is described as being "connected", "combined", or "coupled" with another component, it should be understood that the component may be connected or coupled to another component directly or with another component interposing therebetween.

An actuator for an electromechanical parking brake having a housing with a brush card assembly (hereafter, referred to as an 'actuator') according to the present invention generates large torque by reducing driving of a motor and transmits the torque to the outside to achieve the function of an electromechanical parking brake. To this end, a motor and a gear assembly 50 are disposed in an actuator assembly of the present invention. The gear assembly 50 means the entire structure composed of several gears in the following description.

Figure 1:
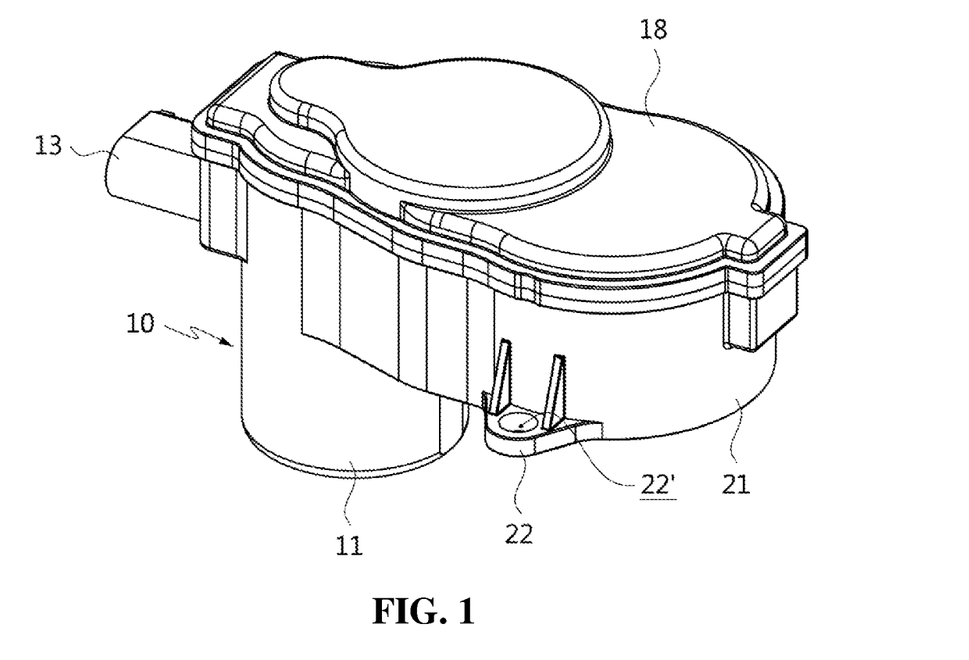
FIG. 1 is a perspective view showing an embodiment of an actuator for an electromechanical parking brake having a housing with a brush card assembly according to the present invention.

Referring first to FIG. 1, the entire outer structure of an actuator is formed by combining a main housing 10 and a cover 18. When the main housing 10 and the cover 18 are combined, a closed installation space 12 is defined therein and several parts are disposed in the installation space 12 to operate the actuator. When the main housing 10 and the cover 18 are combined, only a connector socket 13 and a resultant output shaft 80 protruding downward are partially exposed without the other parts exposed out of the installation space 12. A relative connector (not shown) is inserted in a coupling space of the connector socket 13.

Figure 2:
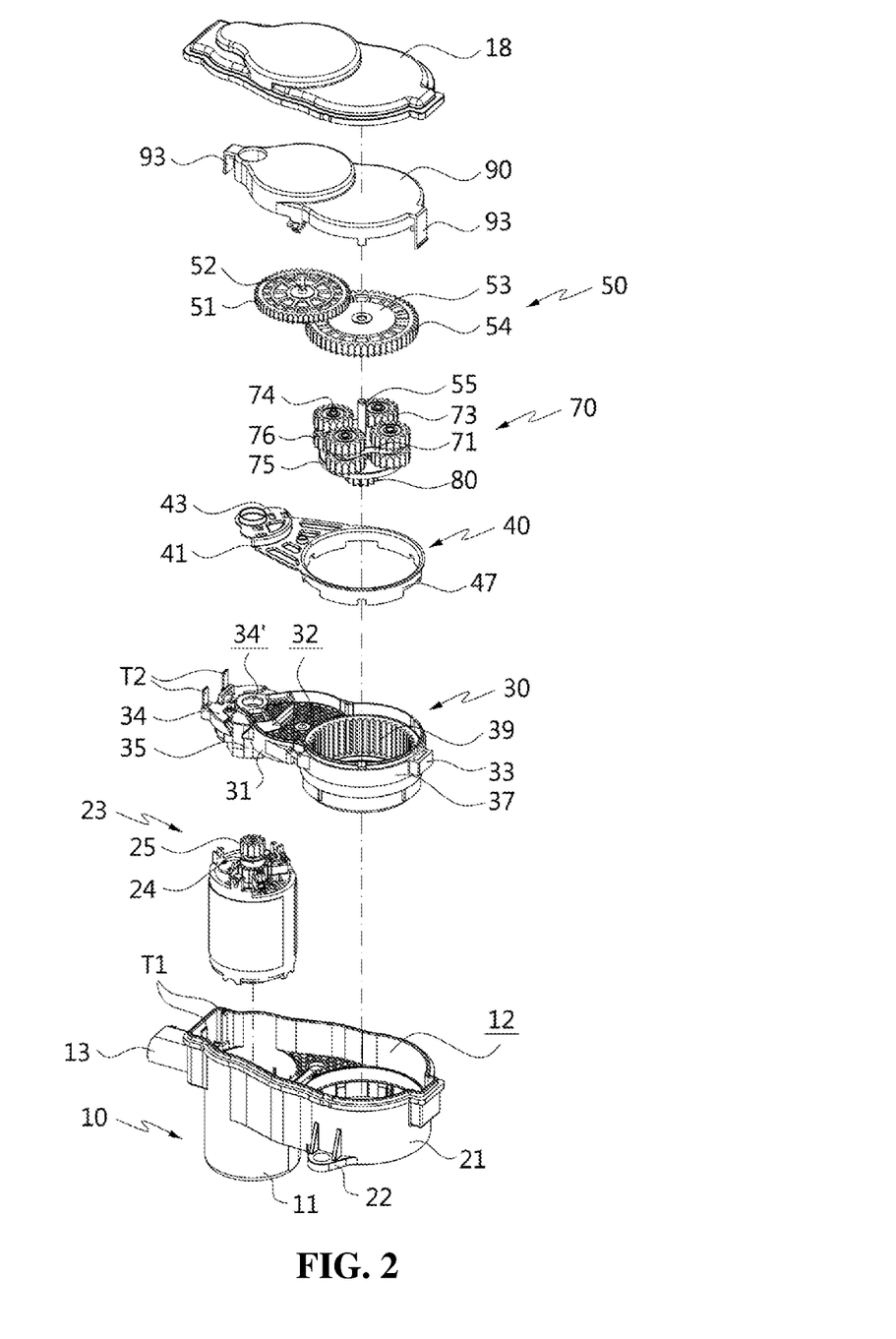
FIG. 2 is an exploded perspective view of the embodiment shown in FIG. 1.

In the configuration of the main housing 10, as shown in FIGS. 1 and 2, the main housing 10 has a motor seat 11 and a gear seat 21 therein. The motor seat 11 and the gear seat 21 are spaced apart from each other and have parallel rotational axes. The main housing 10 is a single unit, and is made of synthetic resin through injection molding in this embodiment.

The main housing 10 can be largely divided into two parts, which are the motor seat 11 and the gear seat 21. Referring to FIG. 2, the motor seat 11 and the gear seat 21 are respectively disposed at the left and right ends of the main housing 10. The connector socket 13 described above is formed close to the motor seat 11 and terminals T1 disposed in the coupling space of the connector socket 13 may be electrically connected in contact with motor terminals T2 of a brush card part 34 to be described below.

An inner housing 30 to be described below is disposed in the installation space 12 at the upper portion in the main housing 10. The inner housing 30 fixes the parts constituting the gear assembly 50, and for example, an idle gear 51 and a drive gear 53 are disposed and a ring gear and the brush card part 34 are integrally formed in the inner housing 30. The installation space 12 extends left and right at the upper portion in the main housing 10 and is closed by the cover 18. Reference number '22' indicates a bracket for mounting and reference number '22"' indicates a fastening hole in which a fastener is inserted.

A motor assembly 23 is accommodated in the motor seat 11. A pinion gear 25 is fitted on a motor shaft 24 of the motor assembly 23 and protrudes upward. The brush card part 34 is disposed over the motor assembly 23 and is integrally formed with the inner housing 30 to be described below. Power is applied to the motor assembly 23 through the brush card part 34. An armature core of the motor assembly 23 is three-dimensionally formed by stacking a plurality of core plates and has a substantially cylindrical shape.

The inner housing 30 is disposed over the motor assembly 23. The inner housing 30 is disposed over the installation space 12 and is made of synthetic resin through injection molding. The inner housing 30 covers most of the upper portion of the installation space 12 and has a shape corresponding to the upper portion of the installation space 12. The inner housing 30 is combined with the main housing 10 and fixes the gear assembly 50 to be described below, and integrally an integrated ring gear operating in mesh with a planetary gear seat 70 of the gear assembly 50 and an integrated brush card electrically connected to the motor assembly 23.

Figure 3:
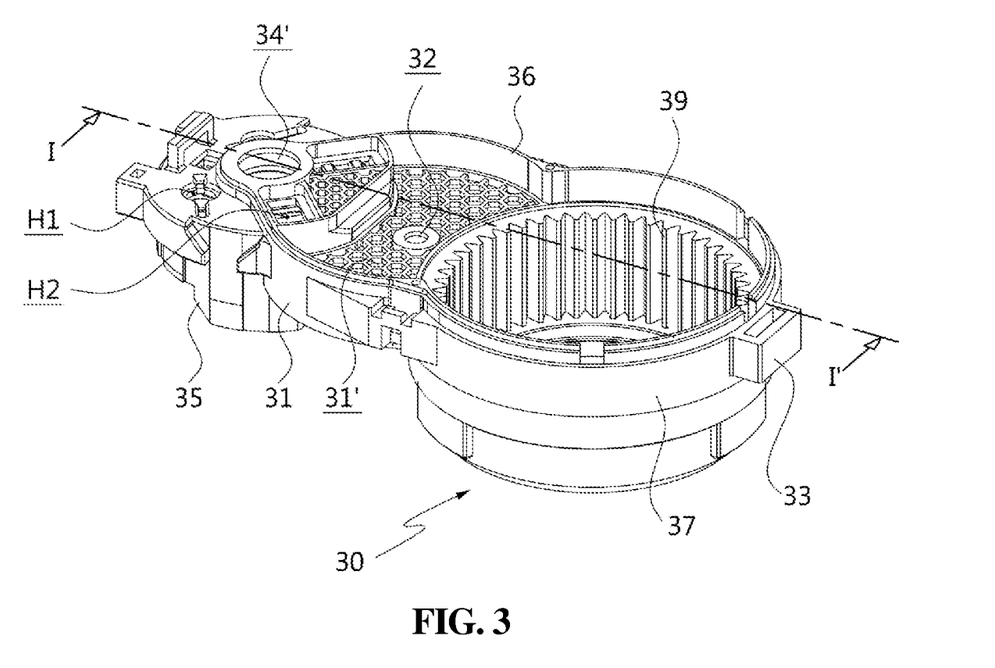
FIG. 3 is a perspective view showing the configuration of an inner housing according to an embodiment of the present invention.

The structure of the inner housing 30 is shown in detail in FIG. 3. As shown in FIG. 3, the inner housing 30 has a three-dimensional shape elongating left and right and largely can be divided into three parts. First, a main body part 31 is positioned at the center, and the brush card part 34 and a ring gear part 37 are positioned at both sides of the main body part 31. The main body part 31, the brush card part 34, and the ring gear part 37 are all integrally formed and are optionally named in accordance with their functions. The main body part 31 forms the fundamental frame of the inner housing 30 and has a gear seat 31' at the upper portion. An idle gear shaft groove 32 is formed at the center of the gear seat 31', so the shaft 52 of an idle gear 51 to be described below is inserted in the idle gear shaft groove 32.

The brush card part 34 is positioned at the left side in FIG. 3 and a brush card body 35 having a predetermined vertical thickness forms the frame of the brush card part 34. The brush card part 34 functions as a brush card assembly, and is not a separate part, but a portion of the inner housing 30. The motor terminals T2 (see FIG. 2), a choke coil (not shown), a brush, etc. are disposed in the brush card part 34. The motor terminals T2 are integrally formed with the brush card part 34 through insert injection molding without a specific assembly process, and the choke coil, the brush, etc. can be assembled through a post process.

The choke coil is electrically connected to the motor terminals T2, thereby supplying electricity that is supplied from the motor terminals T2 to the brush. In this embodiment, the choke coil is connected to the terminals T1 by spot welding and it may be welded through bonding holes H1 formed at the upper portion of the brush card part 34. A brush holder (not shown) is fixed in a fixing holes H2 formed adjacent to the bonding holes H1 and the brush is coupled to the brush holder. As described above, all parts for the brush card assembly can be assembled at the brush card part 34 and the assembling/bonding process can be easily performed through the bonding holes H1 and the fixing holes H2. As a result, power is supplied to the brush card part 34 through the following path. When power is supplied in order of 'terminals T1 of the connector-motor terminals T2-chock coil-brush mounted on the brush-holder-commutator (not shown)-coil wound around the core of the motor assembly 23', the motor can be rotated. Reference numeral '34"' indicates a gear hole in which the pinion gear is disposed.

The inner housing 30 has an installation fence 36. The installation fence 36 protrudes along the edge of the main body part 31 of the inner housing 30, and the idle gear 51, which connects the motor assembly 23 and the gear assembly 50, and the drive gear 53, is in mesh with the idle gear 51 and rotates the planetary gear set 70, are disposed in the gear installation space 31'. In this embodiment, the installation fence 36 protrudes such that it surrounds the side of the drive gear 53.

The inner housing 30 has the ring gear part 37. The ring gear part 37 is disposed at the opposite side to the brush card part 34 in the main body part 31. The ring gear part 37 is formed substantially in a vertically hollow cylindrical shape. The planetary gear set 70 may be inserted over the ring gear part 37 and the resultant output shaft 80 may protrude under the ring gear part 37. Reference numeral '33' not stated above indicates a fastening portion and a fastening hook 93 of an inner cover 90 is fitted in the fastening portion.

The ring gear part 37 is positioned close to the motor seat 11 of the main housing 10 and planetary gears of the planetary gear set 70 are accommodated in the ring gear part 37. Revolution gear teeth 39 are formed on the inner circumferential surface of the ring gear part 37, so the planetary gears revolve in mesh with the revolution gear teeth 39. The revolution gear teeth 39, which are formed around the inner circumferential surface of the ring gear part 37, are integrally formed with the ring gear part 37.

A reinforcing plate 40 is disposed inside the inner housing 30. The reinforcing plate 40 is integrally formed with the inner housing 30 through insert injection molding to prevent distortion of the inner housing 30 by reinforcing strength of the inner housing 30. Accordingly, the reinforcing plate 40 may be made of a material having larger strength than the inner housing 30, so it is made of metal in this embodiment.

Figure 4:
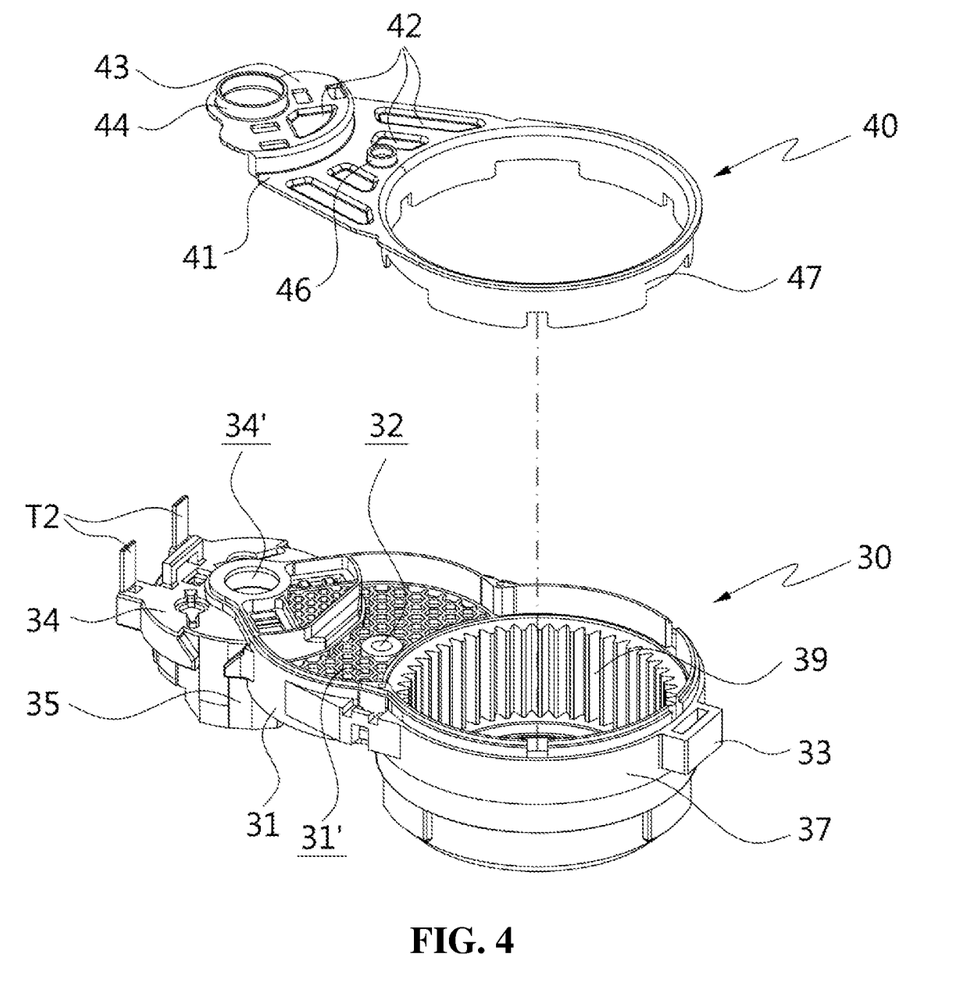
FIG. 4 is an exploded perspective view of a reinforcing plate disposed in the inner housing according to an embodiment of the present invention.

The reinforcing plate 40 is manufactured through insert injection molding inside the inner housing 30, but it is separated from the inner housing 30 in FIGS. 2 and 4 for showing the shape and for the convenience of description. The reinforcing plate 40 is supposed to be disposed inside the inner housing 30, so it has a similar shape to the inner housing 30 and is smaller than the inner housing 30. The reinforcing plate 40 is elongated left and right to reach from the brush card part 34 to the ring gear part 37, similar to the inner housing 30.

Figure 5:
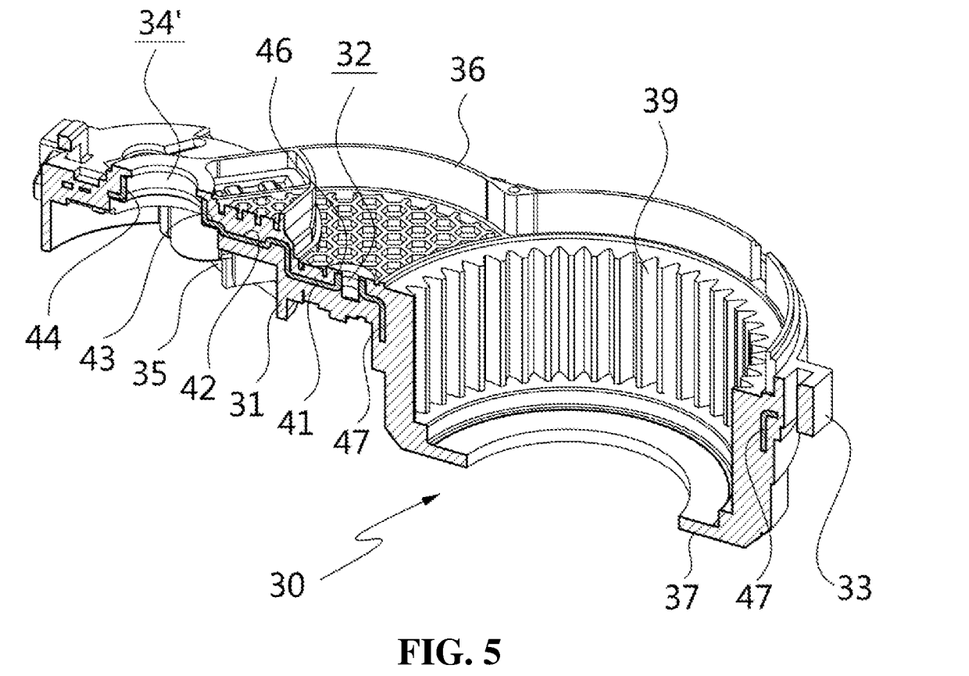
FIG. 5 is a cross-sectional perspective view taken along line I-I' of FIG. 3.

The reinforcing plate 40 generally has an uneven shape. That is, the reinforcing plate 40 is not a flat plate, but has a curved shape with longitudinally different heights, so it has generally an uneven shape. Referring to FIG. 5 that is a cross-sectional perspective view, it can be seen that the reinforcing plate 40 generally has an uneven structure. This shape increases the property against distortion of the reinforcing plate 40 and reinforces the entire strength. Obviously, the strength of the inner housing 30 having the reinforcing plate 40 therein can also be reinforced.

The structure of the reinforcing plate 40 is described in detail. A plate body 41 forms the frame of the reinforcing plate 40, and a brush card-reinforcing part 43 and a ring gear-reinforcing part 47 are formed respectively at both sides of the plate body 41. The brush card-reinforcing part 43 is positioned close to the brush card part 34 of the inner housing 30 and surrounds the edge of the motor shaft of the motor assembly 23. The brush card-reinforcing part 43 has a substantially ring-shaped protrusive reinforcing rib 44 and the reinforcing rib 44 surrounds the pinion gear 25 connected to the motor assembly 23 described above.

The ring gear-reinforcing part 47 is positioned opposite the brush card-reinforcing part 43. The ring gear-reinforcing part 47 is positioned close to the ring gear part 37 of the inner housing 30 and surrounds the edge of a ring gear. As shown in FIG. 4, the ring gear-reinforcing part 47 has a substantially ring shape and extends in a thickness direction (vertically). The ring gear-reinforcing part 47 is disposed inside the ring gear part 37 and reinforces strength of the ring gear part 37.

The reinforcing plate 40 further has reinforcing beads 42. The reinforcing beads 42 are recessed on the reinforcing plate 40 and spaced apart from each other. In this embodiment, the reinforcing beads are distributed on the plate body 41 having a flat plate shape and are also provided on the brush card-reinforcing part. The reinforcing beads 42 themselves have a recessed shape, so they can reinforce strength of the reinforcing plate 40. Reference numeral '46' not stated above is an avoidance hole and an end of the rotary shaft of the idle gear 51 described above is disposed therein.

Figure 6A:
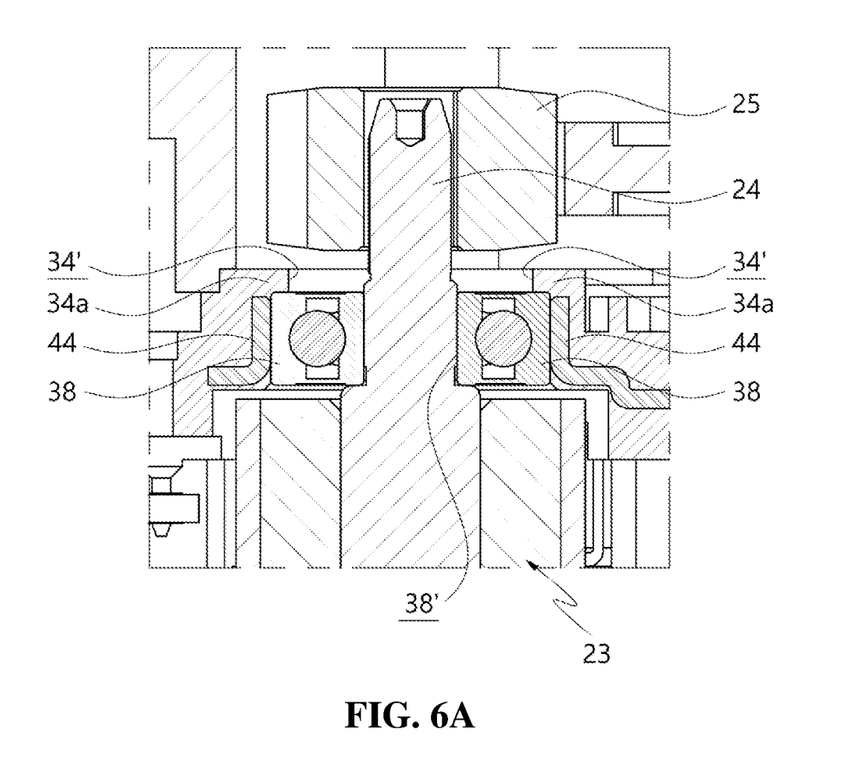
FIGS. 6A and 6B are cross-sectional views showing a brush card part according to an embodiment of the present invention and the structure of a bearing disposed in the brush card part.
Figure 6B:
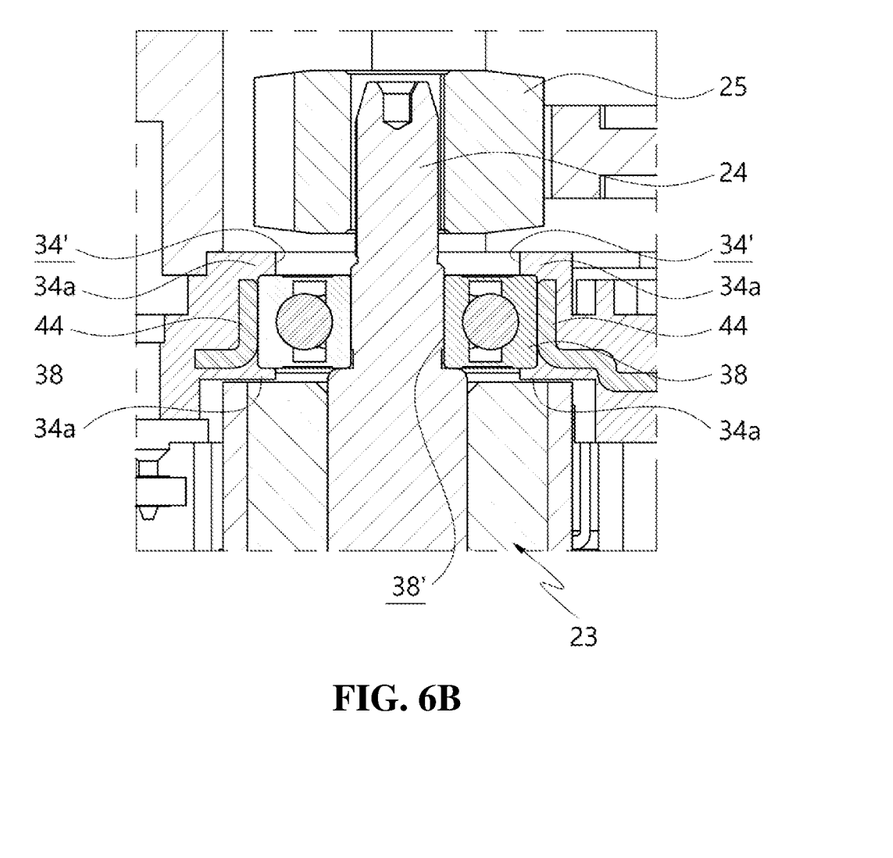

Referring to FIGS. 6A and 6B, a bearing 38 is disposed inside the brush card part 34. The bearing 38, which is provided for smooth rotation of the motor shaft 24, is disposed to surround the motor shaft 24. In this embodiment, the bearing 38 is integrally formed inside the brush card part 34 when the brush card part 34 is formed through insert injection molding. Accordingly, there is no need for machining the bearing 38 to assembly the bearing 38 or separately assembling the bearing 38 with the brush card part 34.

The brush card part 34 has a bearing guide 34a to prevent separation of the bearing 38. The bearing guide 34a protrudes around a gear hole 34' formed at the center of the brush card part 34 and the protruding portion locks the bearing 38, thereby preventing separation of the bearing 38. The bearing guide 34a may be formed on only the top of the brush card part 34, as shown in FIG. 6A, or may be formed on both of the top and bottom of the brush card part 34, as shown in FIG. 6B.

Referring to FIG. 6A, the bearing 38 is disposed adjacent to the reinforcing rib 44 of the brush card-reinforcing part 43. A side of the bearing 38 is supported by the reinforcing rib 44, and this structure can increase durability of the bearing 38, to which large torque can be transmitted from the motor, and the portion around the gear hole 34'.

The ring gear part 50 is disposed inside the inner housing 30. The gear assembly 50 is described hereafter. First, the idle gear 51 is disposed at the center of the inner housing 30. The idle gear 51 is connected to the motor assembly 23, and more accurately, is rotated in mesh with the pinion gear 25 that is rotated by the motor assembly 23. The idle gear 51 changes the rotational direction in mesh with the pinion gear 25 while rotating about the gear shaft 52, and further performs primary reduction. The rotary shaft of the pinion gear 25 is rotated with primary reduction performed between the idle gear 51 and the pinion gear 25. The primary gear is performed with a reduction ratio that is smaller than those of secondary reduction and third reduction to be described below. The drive gear 543 of the gear assembly 50 is engaged with the idle gear 51, so the pinion gear 25 and the drive gear 52 rotate in the same direction. That is, the idle gear 51 connects the pinion gear 25 and the drive gear 53.

The gear assembly 50 includes the drive gear 53. The drive gear 53 is disposed over the ring gear part 37 of the inner housing 30 and rotates with the gear teeth 54 thereof in mesh with the idle gear 51, thereby transmitting torque thereof to the planetary gear set 70 to be described below. The drive gear 53 has a substantially cylindrical shape that is the outer shape of general gears, but a sun gear protrudes downward from the drive gear 53. For reference, the sun gear is not shown in the figures in terms of angle. The idle gear 51 is engaged with the drive gear 53, as described above, and the sun gear engages with and rotates first-stage planetary gears 71 and 73 of the planetary gear set 70.

The gear assembly 50 includes the planetary gear set 70. The planetary gear set 70 is composed of several planetary gears and performs reduction, but the planetary gear set 70 performs two steps of reduction in the present invention. In the planetary gear set 70, the first-stage planetary gears 71 and 73 and second-stage planetary gears 75 and 76 are stacked, thereby respectively performing second reduction and third reduction. The planetary gear set 70 is disposed in the gear seat 21 of the main housing 10 and is operated inside the ring gear part 37 of the inner housing 30 described above. More accurately, there is a rotational space inside the ring gear part 37 described above and the planetary gear set 70 is accommodated in the rotational space.

The structure of the planetary gear set 70 is described hereafter. The planetary gear set 70 is composed of the first-stage planetary gears 71 and 73 and the second-stage planetary gears 75 and 75. The first-stage planetary gears 71 and 73 are disposed at the upper portion and rotated in mesh with the sun gear of the drive gear 53 and the second-stage planetary gears 75 and 75 are disposed at the lower portion and rotated in mesh with sun gears (not shown) of the first-stage planetary gears 71 and 73 and the revolution gear teeth 39 of the ring gear part 37. The first-stage planetary gears 71 and 73 and the second-stage planetary gears 75 and 75 are stacked over and under each other and respectively perform the reduction functions while rotating.

The first-stage planetary gears 71 and 73 of the planetary gear set 70 includes a first carrier 71 that rotates about a main rotary shaft 55 and first planetary gears 73 respectively connected to several first planetary gear shafts 74 of the first carrier 71 and rotating in mesh with the sun gear of the drive gear 53. The first planetary gears 73 rotate about the first planetary gear shafts 74 and also revolve in mesh with the revolution gear teeth 39 inside the ring gear part 37. The first planetary gears 73 revolving in mesh with the sun gear of the drive gear 53 rotate the first carrier 71 and perform secondary reduction between the drive gear 53 and the first planetary gears 73.

Though not shown in the figures, a sun gear protrudes from the first carrier 71. The sun gear protrudes downward from the center of the first carrier 71 and rotates integrally with the first carrier 71. The sun gear rotates second planetary gears 76 to be described below and the second planetary gears 76 are arranged around the sun gear, so when the sun gear rotates, the second planetary gears 76 rotate.

The second-step planetary gears 75 and 76 have a similar structure to the first-step planetary gears 71 and 73. In detail, the second-stage planetary gears 75 and 76 include a second carrier 75 disposed under the first carrier 71 inside the ring gear part 37 and rotating about the main rotary shaft 55, and second planetary gears 76. The second planetary gears 76 are respectively connected to second planetary gear shafts of the second carrier 75. The second planetary gears 76 rotate about the second planetary gear shafts (not shown) and also are accommodated in the ring gear part 37 and revolve in mesh with the gear teeth 39 of the ring gear part 37, whereby they are thirdly reduced. The thirdly reduced rotation is transmitted to the outside through the resultant output shaft 80 connected to the main rotary shaft 55.

The gear assembly 50 is closed by the inner cover 90. The inner cover 90 is coupled to the inner housing 30, thereby closing the gear assembly 50. The inner cover 90 has a protrusive fastening hook 93 and the fastening hook 93 is locked in the fastening portion 33 of the inner housing 30. The inner cover 90 can be coupled to the inner housing 30 by the fastening hook 93 and the fastening portion 33.

A process of operating the actuator for the electromechanical parking brake having a housing with a brush card assembly according to the present invention is described hereafter.

First, when external power is supplied through the connector socket 13, the motor assembly 23 is operated. The operation of the motor assembly 23 rotates the motor shaft 24, so the pinion gear 25 fitted on the motor shaft 24 is rotated. Power supply is made by the connector socket 13 and the brush card part 34 of the inner housing 30, that is, when power is supplied in order of terminals T1 of the connector-motor terminals T2-chock coil-brush mounted on the brush-holder-commutator (not shown)-coil wound around the core of the motor assembly 23', the motor assembly 23 can be rotated.

The pinion gear 25 connected to the motor assembly 23 is rotated by rotation of the motor shaft 24, thereby rotating in the opposite direction the idle gear 51 engaged with the pinion gear 25. Primary reduction is generated between the idle gear 51 and the pinion gear 25.

With the primary reduction generated and the rotational direction changed, the pinion gear 25 is rotated and the drive gear 53 engaged with the pinion gear 25 is rotated. As the drive gear 53 is rotated, the sun gear of the drive gear 53 rotates the planetary gear set 70. More accurately, the sun gear of the drive gear 53 operates the first-stage planetary gears 71 and 73 of the planetary gear set 70. That is, a total of three first planetary gears 73 revolve in mesh with the revolution gear teeth 39 of the ring gear part 37 integrally formed with the main housing 10 and also rotate about the first planetary gear shaft 74. While the planetary gears 73 revolve, the first carrier 71 is rotated. Secondary reduction is generated in this process.

As the first carrier 71 is rotated, the sun gear of the first carrier 71 rotates the second-stage planetary gears 75 and 76. The second planetary gears 76 arranged around the sun gear of the first carrier 71 are rotated in mesh with the sun gear. The second planetary gears 76 rotate about the second planetary gear shaft and revolve in mesh with the revolution gear teeth 39 of the ring gear part 37. In this process, the second carrier 75 is rotated. Third reduction is generated while the second planetary gears 75 and 76 are rotated.

Finally, since the main rotary shaft 55 is fixed to the second carrier 75, the main rotary shaft 55 is rotated with the second carrier 75. The resultant output shaft 80 is disposed at the lower end of the main rotary shaft 55 and finally provides torque to the outside. That is, power is transmitted to the outside through the resultant output shaft 80, thereby performing electrochemical parking.

As described above, the ring gear part 37 operating with the planetary gear set 70 and the brush card part 34 electrically connected to the motor assembly 23 are integrally formed at the inner housing 30 of the present invention. Accordingly, several parts that are operated together are arranged in one inner housing 30, so axial alignment of the motor and the gears can be improved, and the motor assembly 23 and the gear assembly 50 can be more stably operated.

Further, since the reinforcing plate 40 is provided inside the inner housing 30 through insert injection molding and the reinforcing plate 40 is made of metal and reinforces strength of the inner housing 30, the possibility of the inner housing 30 being distorted or damaged due to vibration in long-time use or during operation is decreased.

On the other hand, the revolution gear teeth 39 is not necessarily formed integrally with the ring gear part 37 and it may be separately manufactured or may be made of a high-strength material through insert injection molding. Alternatively, a ring gear 137 may be separately formed and then combined with the inner housing 30. In this case, the ring gear 137 may be made of a different material from the inner housing 30.

Figure 7:
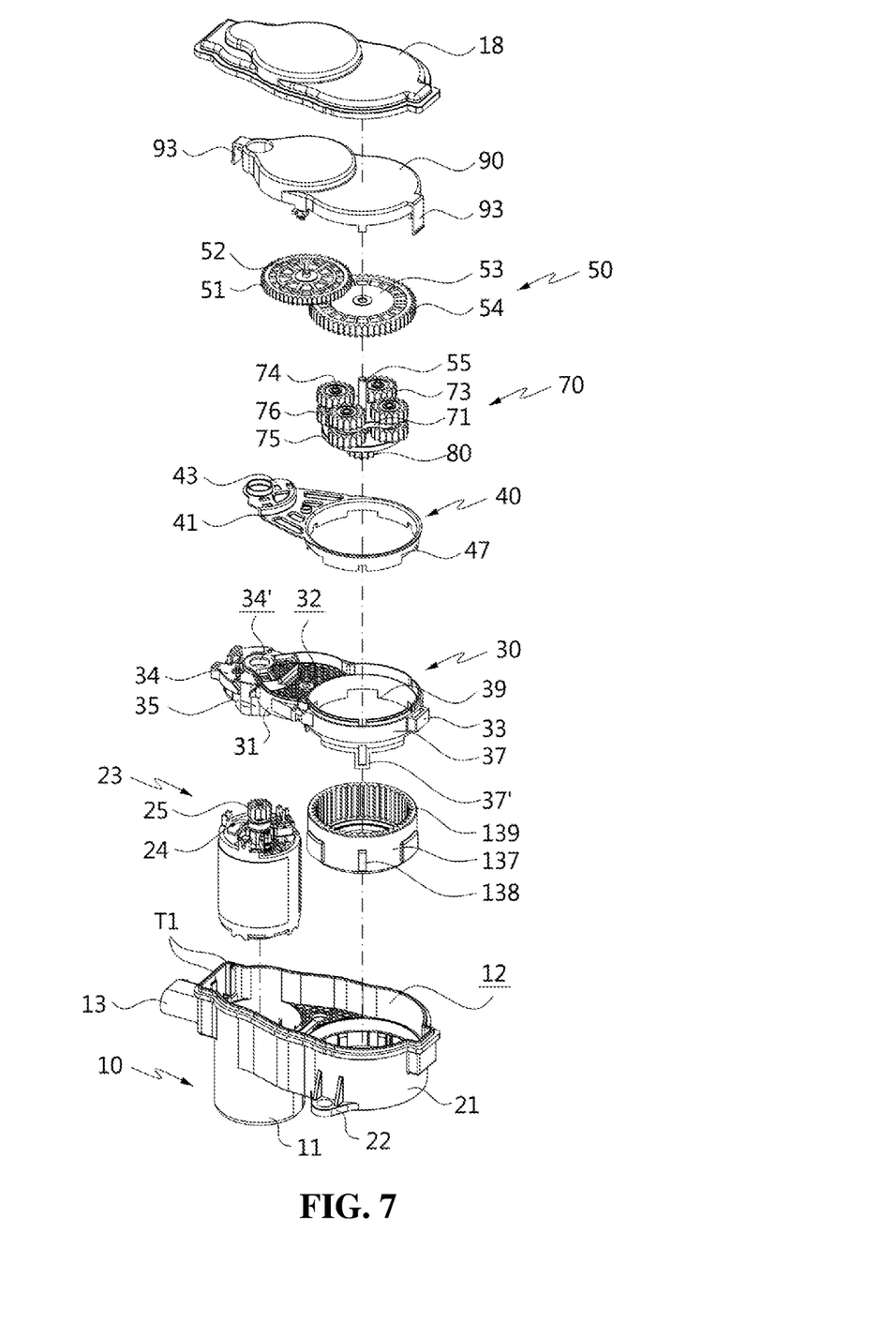
FIG. 7 is an exploded perspective view showing another embodiment of an actuator for an electromechanical parking brake having a housing with a brush card assembly according to the present invention.

Referring to FIG. 7, a ring gear 137 that is a separate part is combined with the ring gear part 37 of the inner housing 30. A coupling step 138 of the ring gear 137 is locked in a coupling portion 37' of the ring gear part 37, whereby they are combined. In the embodiment shown in FIG. 7, the revolution gear teeth 139 are formed at the ring gear 137, not the ring gear part 37. Accordingly, it is possible to separately form only the ring gear 137 and combine the ring gear 137 with the ring gear part 37, and the ring gear 137 and the revolution gear teeth 139 can be made of various materials.

Even if all components of the embodiments of the present invention were described as being combined in a single unit or operated in combination with each other, the present invention is not limited to the embodiments. That is, the all components may be selectively combined and operated within the scope of the present invention. Further, the terms "comprise", "include", "have", etc. when used in this specification mean that the components can exist inside unless specifically stated otherwise, so they should be construed as being able to further include other components. Unless otherwise defined, all terms including technical and scientific terms used herein have the same meaning as commonly understood by those skilled in the art to which the present invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The above description merely explains the spirit of the present invention and the present invention may be changed and modified in various ways without departing from the spirit of the present invention by those skilled in the art. Accordingly, the embodiments described herein are provided not to limit, but to explain the spirit of the present invention, and the spirit of the present invention is not limited by the embodiments. The protective range of the present invention should be construed by the following claims and the scope and spirit of the invention should be construed as being included in the patent right of the present invention.

What is claimed is:

1. An actuator for an electromechanical parking brake having a housing with a brush card assembly, the actuator comprising:
   a main housing having a motor seat and a gear seat;
   a motor assembly disposed in the motor seat and configured to provide torque;
   a gear assembly rotated by the torque from the motor assembly and configured to perform a reduction function through a plurality of gears; and
   an inner housing combined with the main housing to fix the gear assembly to the main housing,
   wherein the inner housing includes:
   a main body part;
   a brush card part disposed at a first side of the main body part and having motor terminals and a brush card to be electrically connected to the motor assembly; and
   a ring gear part disposed at a second side of the main body part opposite to the brush card part, accommodating a planetary gear set, and having revolution gear teeth on an inner circumferential surface to be engaged with the planetary gear set, and
   wherein the brush card part, the main body part, and the ring gear part are connected to each other in a direction orthogonal to a motor shaft of the motor assembly and a resultant output shaft of the planetary gear set, and are made integrally with each other.

2. The actuator of claim 1, wherein a reinforcing plate having an uneven shape is disposed inside the inner housing.

3. The actuator of claim 2, wherein the reinforcing plate is disposed inside the inner housing.

4. The actuator of claim 2, wherein the reinforcing plate is made of metal and is disposed inside the inner housing to extend in a longitudinal direction of the inner housing.

5. The actuator of claim 2, wherein the reinforcing plate includes:
- a brush card-reinforcing part disposed adjacent to the brush card part of the inner housing and having a ring-shaped protrusive reinforcing rib surrounding the motor shaft of the motor assembly; and
- a ring gear-reinforcing part disposed adjacent to the ring gear part of the inner housing and protruding in a ring shape to surround an edge of a ring gear.

6. The actuator of claim 5, wherein the reinforcing plate has a plurality of recessed reinforcing beads.

7. The actuator of claim 1, wherein an installation fence protrudes along an edge of the main body part of the inner housing, and an idle gear connecting the motor assembly and the gear assembly to each other and a drive gear engaged with the idle gear for rotating the planetary gear set are disposed in a space surrounded by the installation fence.

8. The actuator of claim 1, wherein a bearing is disposed in the brush card part to surround the motor shaft and is formed in the brush card part.

9. The actuator of claim 8, wherein the brush card part has a protrusive bearing guide surrounding the bearing to prevent separation of the bearing from the brush card part by locking the bearing.

\* \* \* \* \*